United States Patent [19]
Piotrowski

[11] Patent Number: 5,083,242
[45] Date of Patent: Jan. 21, 1992

[54] ILLUMINATED UNDERWATER WRITING TABLET

[76] Inventor: Matthew S. Piotrowski, 2952 Deegen Dr., Bonita, Calif. 92002

[21] Appl. No.: 656,586

[22] Filed: Feb. 19, 1991

[51] Int. Cl.⁵ .............................................. F21K 2/00
[52] U.S. Cl. ...................................... 362/34; 362/31; 362/97; 362/253
[58] Field of Search ............... 362/31, 34, 97, 109, 362/253, 84; 434/408

[56] References Cited

U.S. PATENT DOCUMENTS

| | | | |
|---|---|---|---|
| 3,781,536 | 12/1973 | Naeseth et al. | 362/34 |
| 4,373,282 | 2/1983 | Wragg | 362/31 X |
| 4,751,615 | 6/1988 | Abrams | 362/31 |
| 4,772,986 | 9/1988 | McNemor | 362/34 X |

*Primary Examiner*—Stephen F. Husar
*Attorney, Agent, or Firm*—Charles C. Logan, II

[57] ABSTRACT

An illuminated underwater writing tablet having an elongated tubular lightsource housing and an elongated tablet sheet of Plexiglass material. The lightsource housing has an elongated slot in its bottom surface that receives the top edge of the tablet sheet. A chemically activated light stick is removably stored in the light source housing and when it is activated it will illuminate the tablet sheet by directing light through its interior. A grease stick is tethered to one end of the lightsource housing. An end cap is tethered to the other end of the lightsource housing.

6 Claims, 1 Drawing Sheet

5,083,242

ILLUMINATED UNDERWATER WRITING TABLET

BACKGROUND OF THE INVENTION

The present invention relates to scuba diving and more specifically to an illuminated underwater writing tablet.

One of the problems that scuba divers have while diving is a difficulty communicating with each other. Most communication is made by hand signals which have an international meaning. The problem of communicating with each other is further magnified when the scuba divers are doing a night dive.

Presently divers use writing tablets or slates that are written upon with a grease pencil or crayon. Only one illuminated writing tablet has been invented and it is illustrated in U.S. Pat. No. 3,781,536. It is essentially in the form of a flask that contains a quantity of chemiluminescent material. This structure does not appear to have been commercially marketed.

It is an object of the invention to provide a novel illuminated underwater writing tablet that can be used both during the daylight hours and also on night dives for communication between divers.

It is also object of the invention to provide a novel illuminated underwater writing tablet that can be economically manufactured and marketed.

It is another object of the invention to provide a novel illuminated underwater writing tablet that can use a disposable chemically activated lightstick.

It is an additional object of the invention to provide a novel illuminated underwater writing tablet that has a grease pencil tethered thereto.

SUMMARY OF THE INVENTION

The novel illuminated underwater writing tablet has been designed for use during daylight and night scuba diving. It is a hand held tablet which allows for visual communication between divers by writing on the tablet with a grease pencil.

The illuminated underwater writing tablet does not contain any electric components and it is completely self-contained. The structure has an elongated tablet sheet made of translucent synthetic resin material sold under the trademark PLEXIGLASS. The top edge of the tablet sheet is inserted into a slot formed in a tubular lightsource housing and bonded thereto.

The lightsource housing would preferably be made of plastic material and it has one of its ends closed and a removable cap on its other end. The chamber within the lightsource housing would removably receive a chemically activated lightstick (cyalume lightstick/safety light, such as illustrated in U.S. Pat. Nos. 3,539,794 and 3,591,362). The width of the tablet sheet is compatible with the dimensions the cyalume lightstick.

By bonding the leading edge of the tablet sheet to the lightsource housing, in the pre-cut slot, intimate contact between the leading edge of the tablet sheet and the lightstick is obtained once the lightstick is inserted into the lightsource housing. After the lightstick is activated, the light is directed lengthwise only through the sheet of synthetic resin material because the lightsource is otherwise confined within its housing. As the tablet sheet becomes illuminated, the diver will find ease in recording, reading, and passing information between dive partners. Recording information is accomplished by using an attached non-hygroscopic, refillable grease pencil.

The illuminated underwater writing tablet is made of materials that can withstand the rigors of daily diving operations. Cyalume lightsticks and grease pencils are easily obtainable worldwide. The illuminated underwater tablet is simple to use and it is virtually foolproof.

DESCRIPTION OF THE PREFERRED EMBODIMENT

Figures 1, 2, 3, 4, 5:
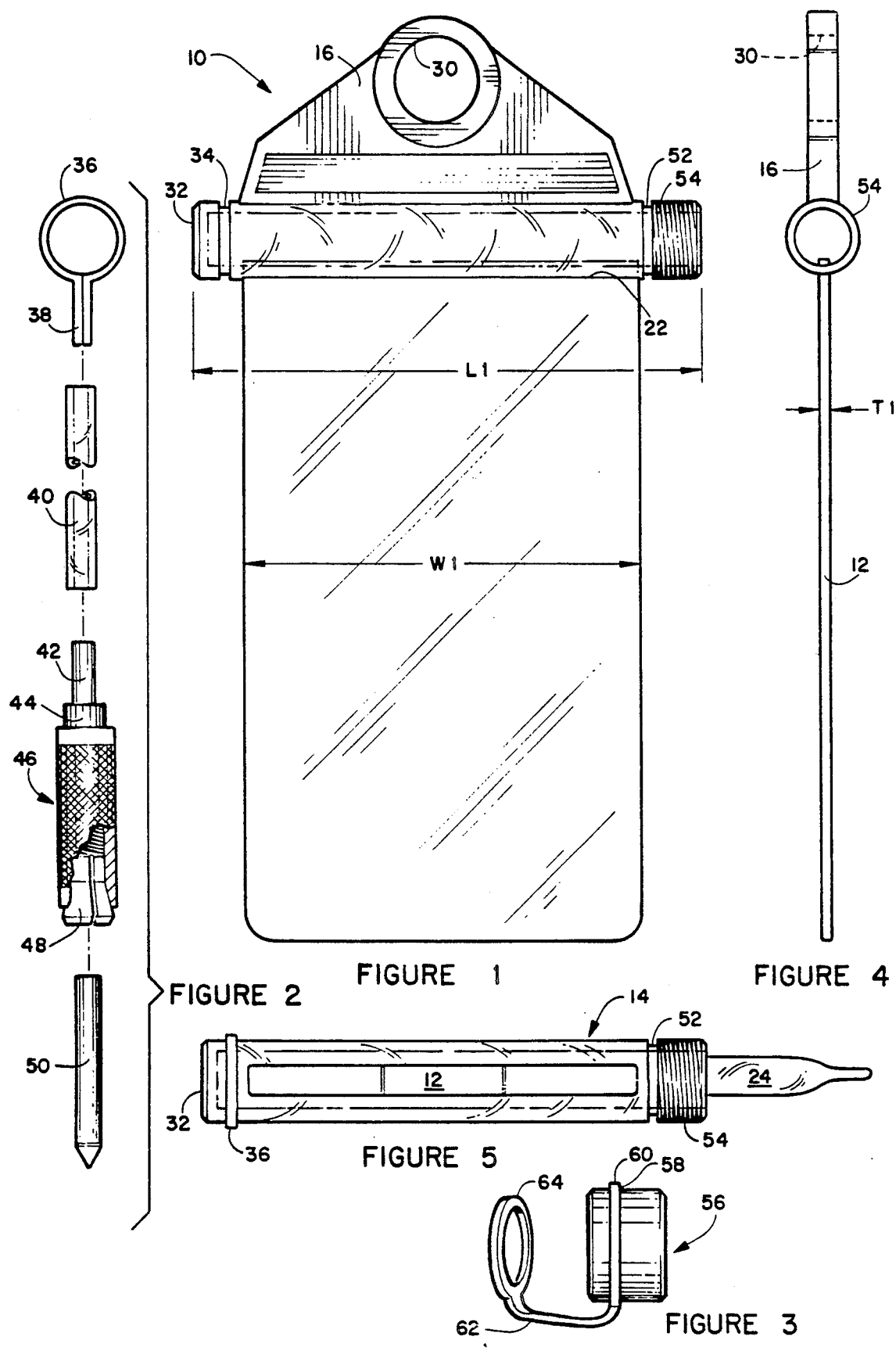
FIG. 1 is a front elevation view of applicant's novel illuminated underwater writing tablet.
FIG. 2 is an exploded elevation view of the grease stick and the structure used to tether it to the lightsource housing.
FIG. 3 is a front perspective view of the removable end cap and its structure for tethering it to the lightsource housing.
FIG. 4 is a side elevation view of the illuminated underwater writing tablet.
FIG. 5 is a bottom plan view of the illuminated underwater writing tablet showing a partially inserted cyalume lightstick.

The novel illuminated underwater writing tablet will now be described by referring to FIGS. 1-5 of the drawing. The illuminated underwater writing tablet is generally designated numeral 10.

Illuminated underwater writing tablet 10 is formed from a sheet 12 of plastic material, a tubular light source housing 14, a head panel 16, and a grease pencil assembly 18.

Sheet 12 has a width W1 and a thickness T1. The top edge of sheet 12 is inserted in slot 22 and bonded in position. A cyalum lightstick 24 when it is inserted into lightsource housing 14 is preferrably wedged into contact with the top edge of sheet 12.

Head panel 16 has an attachment aperture 30 through which a cord or line may be threaded and tied so it may be carried by a diver.

The left end of lightsource housing 14 has an end wall and an inwardly spaced annular groove 34.

Grease pencil assembly 18 has an anchor ring 36 that is detachably secured in annular groove 34. A pair of leg members 38 extend downwardly from anchor ring 36 and are frictionally held in the top end of tubing member 40. The bottom end of tubing member 40 frictionally receives the top end of cylindrical rod 42 that is mounted on a plug member 44. Tubular locking collar 46 has a chuck-like structure with multiple gripping fingers 48 that close around the top end of grease pencil 50.

The right end of tubular lightsource housing 14 has an annular groove 52 spaced inwardly from external threads 54. A cap 56 has an annular groove 58 that detachably receives ring 60. A tether connecting member 62 has one of its ends connected to ring 60 an its other end connected to ring 64 that is detachably secured in annular groove 52.

What is claimed is:

1. An illuminated underwater writing tablet comprising:

an elongated tablet sheet of plastic material having a top edge, a bottom edge, and laterally spaced side edges, said tablet sheet having a predetermined width W1 and a predetermined thickness T1;

an elongated tubular light source housing having a predetermined length L1 that is greater than W1, said light source housing being oriented transversely to the longitudinal axis of said tablet sheet;

said light source housing having a closed left end and an open right end;

a removable end cap for the right end of said light source housing and means for tethering said end cap to said light source housing when the end cap has been removed;

said light source housing having a longitudinally extending cutout slot whose length is W1 and whose width is T1 and the top edge of said tablet sheet is received in said cutout slot; and A chemically activated light stick removably stored in said light source housing which when activated will illuminate said tablet sheet by directing light through the interior of said tablet sheet.

2. An illuminated underwater writing tablet as recited in claim 1 (1) further comprising a head panel secured to (the top surface of) said lightsource housing.

3. An illuminated underwater writing tablet as recited in claim 1 wherein said tablet sheet has a substantially rectangular configuration.

4. An illuminated underwater writing tablet as recited in claim 1 wherein the material of said tablet sheet is substantially rigid.

5. An illuminated underwater writing tablet as recited in claim 1 (1) wherein said tablet sheet is made of (Plexiglass material) a synthetic resin material sold under the trademark PLEXIGLASS.

6. An illuminated underwater writing tablet comprising:

an elongated tablet sheet of plastic material having a top edge, a bottom edge, and laterally spaced side edges, said tablet sheet having a predetermined width W1 and a predetermined thickness T1;

an elongated tubular light source housing having a predetermined length L1 that is greater than W1, said light source housing being oriented transversely to the longitudinal axis of said tablet sheet;

said light source housing having a closed left end, and an open right end;

a grease stick and means for securing it to one end of said light source housing;

said light source housing having a longitudinally extending cutout slot whose length is W1 and whose width is T1 and the top edge of said tablet sheet is received in said cutout slot; and a chemically activated light stick removably stored in said light source housing which when activated will illuminate said tablet sheet by directing light through the interior of said tablet sheet.

* * * * *